United States Patent [19]

Lux, Jr.

[11] Patent Number: 6,008,452
[45] Date of Patent: Dec. 28, 1999

[54] SAFETY LOCK FOR A PEDESTAL COVER

[75] Inventor: Robert J. Lux, Jr., Broken Arrow, Okla.

[73] Assignee: Armin Thermodynamics, Broken Arrow, Okla.

[21] Appl. No.: 09/065,305

[22] Filed: Apr. 23, 1998

[51] Int. Cl.⁶ .................................................. H02G 9/00
[52] U.S. Cl. ............................ 174/37; 174/38; 174/39; 174/58; 220/3.3; 52/3; 264/154; 248/150
[58] Field of Search ................................. 174/38, 37, 39, 174/50, 52.1, 17 CT, 17 R, 58, 59; 264/154; 248/156; 220/3.3; 52/3

[56] References Cited

U.S. PATENT DOCUMENTS

| Re. 17,171 | 12/1928 | Rittenhouse | 336/90 |
| Re. 31,134 | 1/1983 | Lux, Jr. | 336/65 |
| 1,793,038 | 2/1931 | Zimmermann | 404/26 |
| 3,279,838 | 10/1966 | Hamilton | 292/251 |
| 3,286,133 | 11/1966 | Sturdivan | 317/104 |
| 3,341,718 | 9/1967 | Acker | 307/157 |
| 3,450,945 | 6/1969 | Wurdack | 317/15 |
| 3,466,379 | 9/1969 | Lohman | 174/38 |
| 3,530,781 | 9/1970 | Kesinger | 98/101 |
| 3,652,779 | 3/1972 | Grinols | 174/38 |
| 3,709,401 | 1/1973 | Walstrom | 220/55 C |
| 3,755,614 | 8/1973 | Jakacki | 174/59 |
| 3,806,630 | 4/1974 | Thompson et al. | 174/72 R |
| 3,812,279 | 5/1974 | Voegeli | 174/38 |
| 3,868,040 | 2/1975 | Langmack, Jr. et al. | 220/484 |
| 3,878,314 | 4/1975 | Link | 174/37 |
| 3,892,910 | 7/1975 | Smith | 174/37 |
| 3,938,285 | 2/1976 | Gilbu | 52/20 |
| 3,974,933 | 8/1976 | Toth et al. | 220/3.8 |
| 4,059,199 | 11/1977 | Quaney | 220/3.8 |
| 4,089,139 | 5/1978 | Moffa | 52/20 |
| 4,097,683 | 6/1978 | Summers | 174/38 |
| 4,190,734 | 2/1980 | Dressler, Jr. | 174/38 |
| 4,213,111 | 7/1980 | Lux, Jr. | 336/65 |
| 4,267,399 | 5/1981 | Lux, Jr. | 174/1 |
| 4,534,586 | 8/1985 | Smith | 292/228 |
| 4,579,248 | 4/1986 | Gorges | 220/327 |
| 4,626,610 | 12/1986 | Masters | 174/37 |
| 4,626,616 | 12/1986 | Masters | 174/37 |
| 4,631,353 | 12/1986 | Marks | 174/16 R |
| 4,632,269 | 12/1986 | Rose | 220/3.8 |
| 4,723,866 | 2/1988 | McCauley | 404/25 |
| 4,772,154 | 9/1988 | Caroulle | 404/25 |
| 4,790,973 | 12/1988 | Minami et al. | 264/242 |
| 5,111,000 | 5/1992 | Maraldo | 174/38 |
| 5,117,067 | 5/1992 | Jaycox | 174/38 |
| 5,134,541 | 7/1992 | Frouin | 361/334 |
| 5,235,133 | 8/1993 | Roth et al. | 174/37 |
| 5,312,202 | 5/1994 | Newton | 404/25 |
| 5,384,427 | 1/1995 | Volk et al. | 174/38 |
| 5,401,902 | 3/1995 | Middlebrook et al. | 174/38 |

FOREIGN PATENT DOCUMENTS

| 704591 | 4/1966 | Italy . |
| 93026071 | 12/1993 | WIPO | 174/38 |

Primary Examiner—Kristine Kincaid
Assistant Examiner—Dhiru R Patel
Attorney, Agent, or Firm—Head, Johnson & Kachigian

[57] ABSTRACT

A closure for use on a hollow, upright, open top and open bottom pedestal for receiving underground wiring having a circumferential collar portion surrounding the open top that receives a nut member, the closure being hollow with a closed top and an open bottom and a circumferential collar portion surrounding the open bottom, the open bottom being dimensioned to telescopically receive the pedestal open top and having a radially oriented opening in the cover collar portion that is in alignment with the nut member when the cover is in closed position on the pedestal, including a radially extending tubular barrel welded to the cover collar portion in alignment with the opening therein and extending radially and exteriorly of said cover collar portion and a bolt received within the tubular barrel and threadably engageable with the nut.

11 Claims, 2 Drawing Sheets

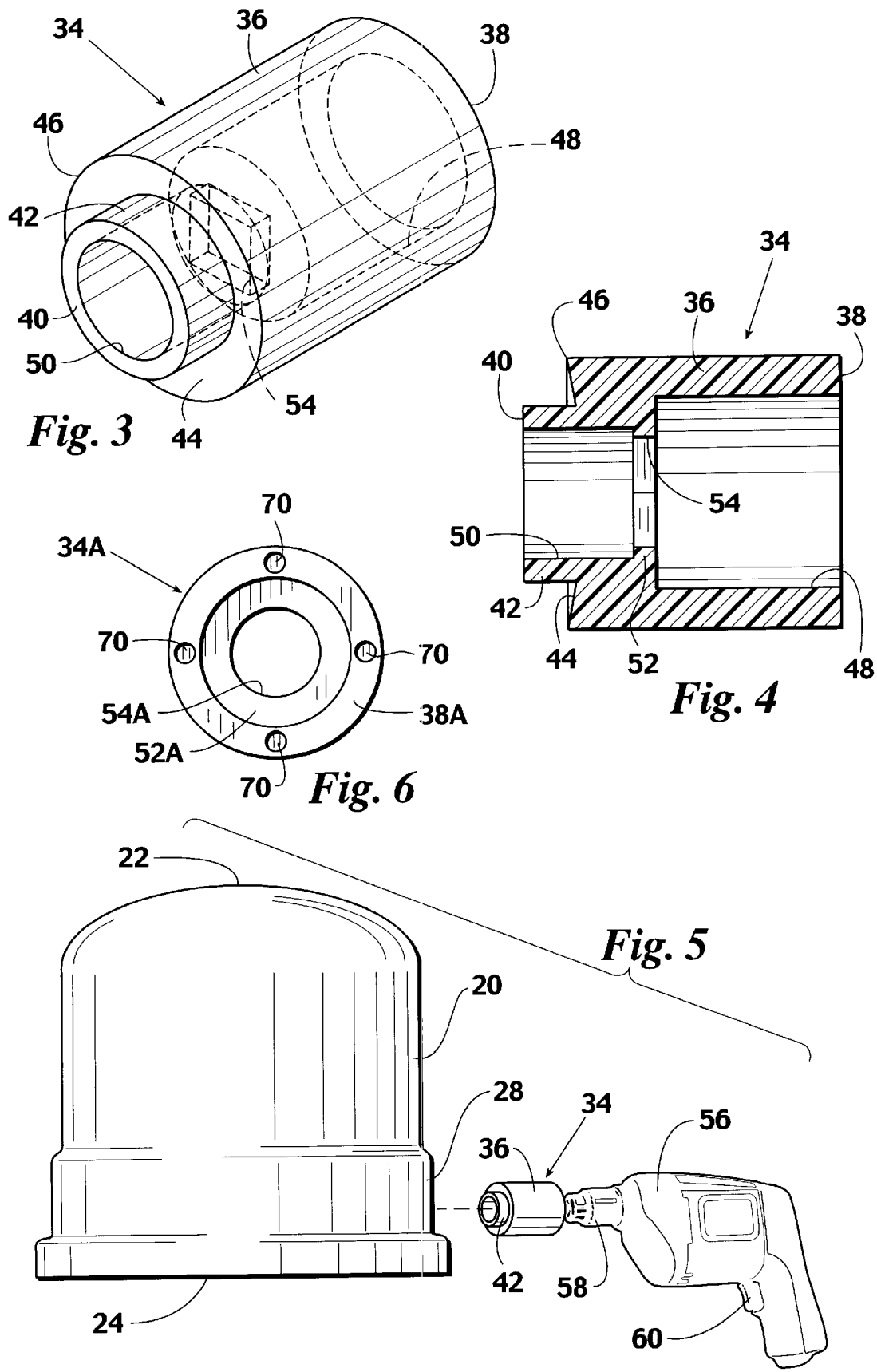

SAFETY LOCK FOR A PEDESTAL COVER

BACKGROUND OF THE INVENTION
1. Field of the Invention

In the past electrical cables, whether for power, telephone, television or communication have typically been mounted on poles stretched above ground. In recent years a trend has developed in which more and more electrical cables are run underground, particularly in residential areas. It is a common practice to install facilities for connecting or disconnecting underground cables and for this purpose accesses are required. The typical access to an underground cable is called a "pedestal" and is an open top and open bottom structure, usually circular in horizontal cross-sections. It is buried in the ground with the open top extending above the ground. The cables are brought into the pedestal through the open bottom and extend upwardly through the open top. A pedestal cover is then used to close the pedestal to prevent access to the underground cables, and the connections made in the pedestal, from all but authorized personnel. Unauthorized access to underground cables can, in the case of power cables, be extremely hazardous and in the case of telephone, television or communication cables can provide the opportunity for mischiefwherein services can be disrupted. In addition, it is important to prevent entry of rain and snow out of the underground pedestal.

For all these reasons, a cover plays an important part in the effective use of a pedestal to provide access to underground wiring. It is important that provision be made whereby covers can be locked onto a pedestal. An improved system for providing a safety lock for a pedestal cover is the subject of this disclosure.

2. Prior Art

As an example of a type of cover employed on a pedestal that receives underground cables reference may be had to U.S. Pat. No. 3,812,279 entitled "Cable Television Housing With Lockable Joined Cover and Base". For additional background information relating to devices that are lockable on closures, see the following United States Patents:

| U.S. PAT. NO. | INVENTOR | TITLE |
| --- | --- | --- |
| 3279838 | Hamilton | Locking Securement For Sheet Metal Housing Cover |
| 3286133 | Sturdivan | Meter Pedestal |
| 3341718 | Acker | Combined Street Light and Residential Power Construction |
| 3450945 | Wurdack | Circuit Switching Aid Protecting Arrangement |
| 3466379 | Lohman | Underground Utility Cable or Conduit Terminal |
| 3530781 | Kesinger | Transformer Housing And Vented Cover Assembly |
| 3652779 | Grinols | Underground Cable Pedestal |
| 3709401 | Walstrom | Tamper Resistant Fastening Apparatus |
| 3755614 | Jakacki | Sealed Underground Wiring Test Station |
| 3812279 | Voegeli | Cable Television Housing With Lockably Joined Cover and Base |
| 3938285 | Gilbu | Manhole And Method of Manufacture |
| 3974933 | Toth et al | Explosion Proof and Watertight Enclosure With Inspectable Means For Verifying Validity Of Reclosure |
| 4059199 | Quaney | Utility Box Fastener |
| 4089139 | Moffa et al | Segmented Cylindrical Reinforced Plastic Manhole Structure |
| 4097683 | Summers | Terminal Housing For Buried Electrical Cables and Method Of Expanding Same |
| 4190734 | Dressler, Jr. | Cable Pedestal Rodent Guard System, Method of Constructing Same, and Kit and Composition |
| 4213111 | Lux, Jr. | Ground Level Transformer Unit |
| 4267399 | Lux, Jr. | Transformer Pad With Cable Protective Sleeve |
| 4534586 | Smith | Automatic Locking Device |
| 4579248 | Gorges | Access Panel Assembly For Aircraft Fuel Tank |
| 4626616 | Masters | Anti-Tapping Device To Prevent Unauthorized Connections To Electrical Utility Service Cables |
| 4631353 | Marks | Terminal Pedestal For Buried Cable Installation |
| 4632269 | Rose | Waterproof Electrical Enclosures |
| 4723866 | McCauley | Manhole Cover Locking Bolt Construction |
| 4772154 | Caroulle | Sealing Gasket For A Broadway Manhole |
| 5111000 | Maraldo | Enclosure For Semi-Buried Electrical Distribution Apparatus |
| 5117067 | Jaycox | Environmentally Sealed Pedestal |
| 5134541 | Frouin | Distribution Station For Water And/Or Gas And/Or Fuel And/Or Electricity And/Or Any Other Fluid |
| 5235133 | Roth et al | Housing |
| 15312202 | Newton | Access Cover Assembly |
| RE 31,134 | Lux, Jr. | Ground Level Transformer Unit |
| Italy 704591 | Bassani | Metodo e dispositivo per ricavare cavite per l'incasso di installazioni elettriche in plafoni in getto di cemento |

SUMMARY OF THE INVENTION

An improved closure for use on a pedestal for receiving underground wiring is the subject of this disclosure. More specifically, an improved locking system for a pedestal cover is disclosed. A pedestal is a hollow, upright container made of rigid material such as metal, plastic or fiberglass, however, plastic is a preferred material because of its resistant to deterioration and its economy. The typical pedestal is open at the top and open at the bottom, the open bottom providing access for the entry of underground cables or conductors. The term "conductors" as used herein means conductors for electrical power, telephone, television, communication and so forth.

A pedestal is typically buried in the ground with the upper portion having the open top extending above the earth's surface. The typical pedestal has, surrounding the open top, a collar portion that is particularly configured to receive a cover.

A hollow cover is provided for closing access to the pedestal. The cover has an open bottom and a closed top and an integral circumferential collar portion surrounding the open bottom that is configured to receive the upper open end of the pedestal in a manner to prevent the entry of rain and snow into the pedestal.

A nut member is embedded or otherwise secured within the collar portion surrounding the upper open end of the pedestal.

A radially extending barrel is affixed to the cover adjacent to the open bottom end thereof, the barrel being tubular and communicating with an opening provided in the cover collar portion. The barrel is preferably formed of plastic and in a preferred embodiment of this invention the cover and barrel are both formed of "thermoplastic", that is, plastic that can be welded by heat fusion.

The barrel has an internal flange with an opening therethrough, that is, a flange portion that provides an opening of an interior diameter less than the interior diameter of the outer end portion of the barrel. In a preferred arrangement, the barrel has an inner end with an integrally extending reduced external diameter boss portion. Further, in one preferred embodiment, the opening through the barrel internal flange is non-circular, such as square, to slidably receive a tool by which the barrel may be rotated.

The barrel is attached to the cover by thermowelding, that is, by heating the contacting portions of the barrel and the cover each to a molten state and retaining the parts in contact with each other until the temperature of the molten area reduces to the point that the plastic components become rigid, a technique commonly employed in the industry for joining lengths of plastic pipe. In the preferred concept, the barrel is thermally fused to the cover by inserting a tool into the barrel to extend within the non-circular opening in the internal flange, the tool being received within a hand drill or the like so the barrel can be rapidly rotated. The barrel is positioned against the exterior surface of the cover to extend radially therefrom with the integral boss portion extending within the opening in the cover. The barrel is rapidly rotated so that frictional engagement with the cover, causing the cover and the inner end of the barrel to heat to a molten state. When the inner end of the barrel and the area of the cover contacted by the barrel inner end reach the molten state, rotation is stopped and the barrel is held for a few seconds against the cover until the contacting portions cool below the molten temperature, again requiring only a brief time of a few seconds, after which the tool used to rotate the barrel is slidably removed and the barrel is permanently welded to the cover.

A bolt is inserted within the barrel extending through the opening in the internal flange, the inner end of the bolt being threadably engageable with the nut member anchored in the pedestal. By threading the bolt into the nut member, the cover is locked to the pedestal and can only be removed by unthreading the bolt. To provide security, the bolt preferably has a head that is non-conventional, that is, which is shaped so that it is not rotatably engageable by commonly available tools. As an example, the head of the bolt may be five sided rather than hexagonal, octagonal, square or so forth.

A spring is preferably position on the bolt within the barrel between the internal flange and the head of the bolt. A grommet is also preferably positioned on the bolt interiorly of the flange so that when the cover is to be removed and the bolt is unthreaded, the spring will push the bolt outwardly when unthreaded to let the operator know the bolt has been unthreaded. The grommet serves to keep the bolt when in the unthreaded position properly within the barrel so that it is not inadvertently displaced.

A better understanding of the invention will be obtained from the following detailed description of the preferred embodiments taken in conjunction with the attached drawings.

BRIEF DESCRIPTION OF THE DRAWINGS

FIG. 3 is an external isometric view of a preferred embodiment of the barrel as shown in FIG. 2.

FIG. 4 is a cross-sectional view of the barrel of FIG. 3.

FIG. 5 is an exploded view showing the steps involved in attaching the barrel to the cover by frictional welding. FIG. 5 shows a hand drill used for rotating the barrel to frictional weld.

FIG. 6 is an end view of an alternate arrangement of the barrel showing a different way by which the barrel can be contacted by a tool used for rotating the barrel to frictionally weld it to the cover.

DETAILED DESCRIPTION OF THE PREFERRED EMBODIMENTS

Figure 1:
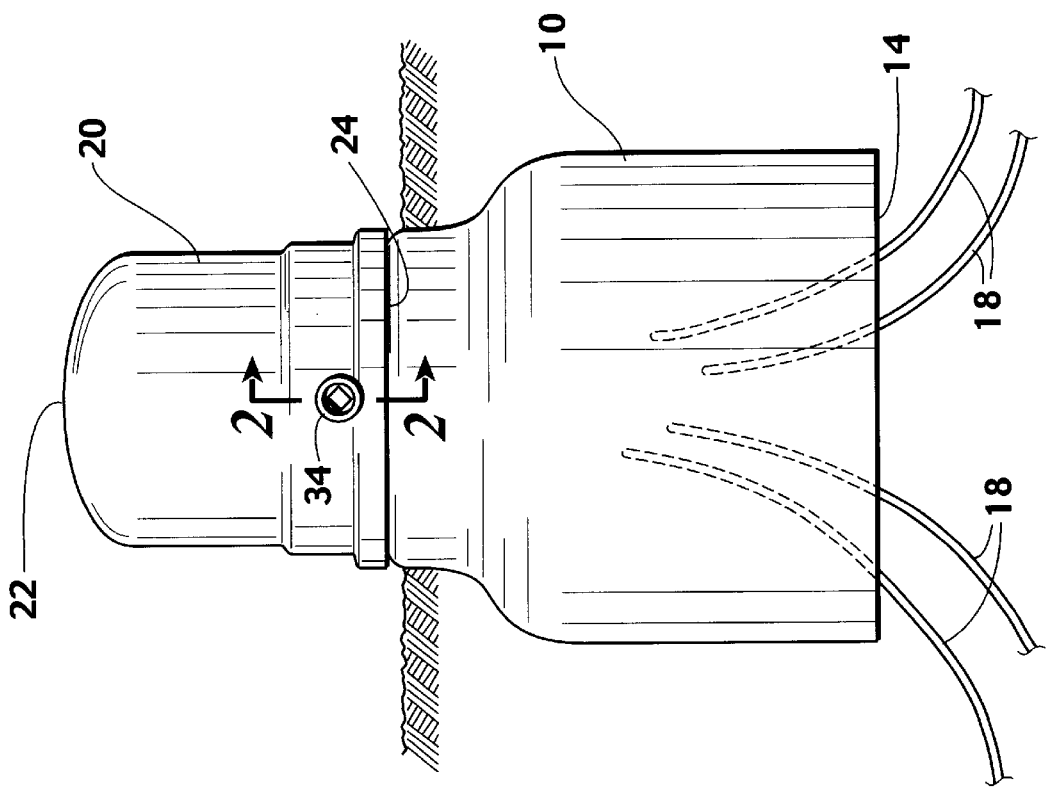
FIG. 1 is an elevational external view of a pedestal, shown substantially buried underground with a cover positioned thereon and with a barrel extending outwardly from the cover that receives a bolt by which the cover is locked on the pedestal.

FIG. 1 shows the basic environment in which the improved safety lock for a pedestal cover of this invention is employed. A pedestal for receiving underground wiring is indicated by the numeral 10, the pedestal having a cylindrical sidewall, an open bottom 14 and an open top 16, a cross-section of the open top being seen in FIG. 2. Conductors 18 enter pedestal 10 through open bottom 14, the conductors being such as for providing power or telephone, television or communication signals including fiberoptic cables.

Pedestal 10 is mounted in the earth with the open top 16 above the earth's surface. To provide access to the interior of pedestal 10 to facilitate connecting and disconnecting conductors 18 and to keep out rain and snow, a cover 20 is employed. Cover 20 has a closed top 22 and an open bottom 24.

Figure 2:
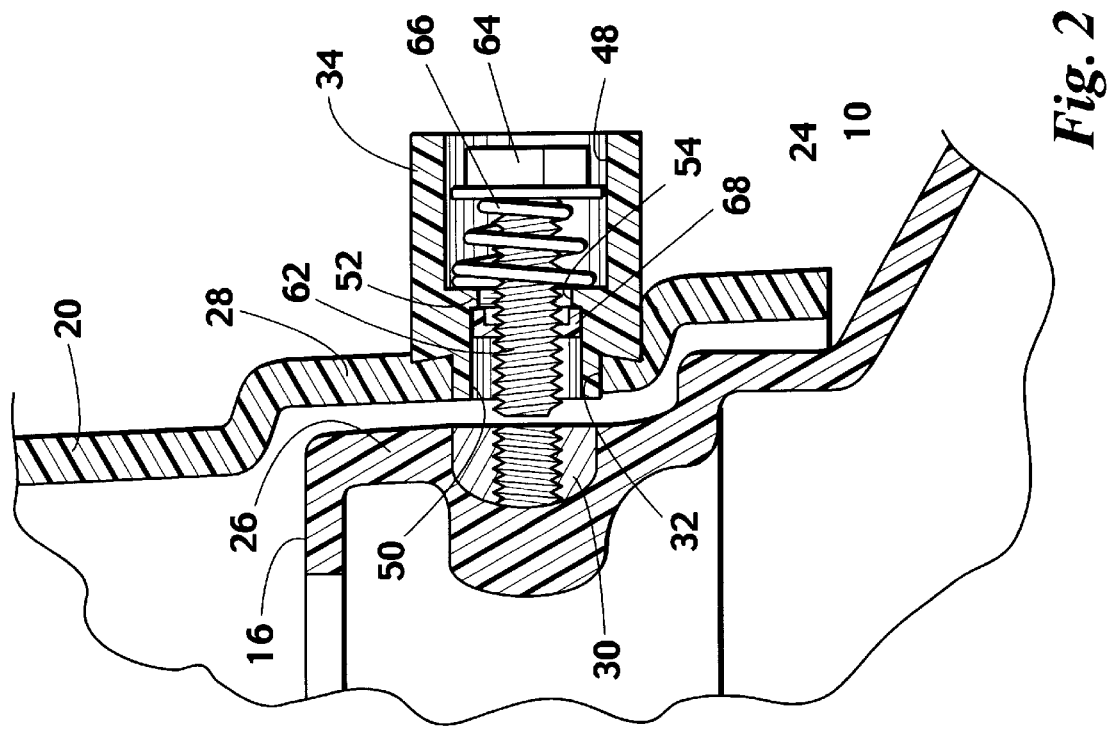
FIG. 2 is a fragmentary enlarged cross-sectional view of the upper portion of the pedestal and the lower portion of the cover showing the system for removably securing the cover to the pedestal. The locking system includes a radially extending barrel that receives a bolt.

As seen in FIG. 2, pedestal 10 has adjacent the open top 16 a circumferential integral collar portion 26 and, in similar manner, cover 20 has adjacent open bottom 24 and integral circumferential collar portion 28. The collar portions 26 and 28 are configured to receive each other in a manner to provide multiple closing contacts between the interior of the cover and the exterior of the pedestal to help prevent entry of rain or snow and also to reduce the possibility of children extending wires into the enclosure.

Imbedded within collar portion 26 of pedestal 10, as seen in FIG. 2, is a nut member 30. The nut member is preferably embedded during the process of molding pedestal 10. In alignment with nut member 30, an opening 32 is provided in cover collar portion 28, the opening being used for attachment of a barrel 34.

Barrel 34 is shown in exterior isometric view in FIG. 3 and cross-sectional view in FIG. 4. It is tubular, having a cylindrical sidewall 36, an outer end 38 and an inner end 40. The inner end includes an integral reduced external diameter boss portion 42, the difference in diameters between boss portion 42 and sidewall 38 providing a radial flange surface 44. FIG. 4 shows that the radial flange surface 44 is inclined inwardly in a concave manner providing an outer circumferential edge 46.

The interior of barrel 34 has a larger internal diameter portion 48 adjacent outer end 38 and a smaller internal diameter cylindrical surface 50 adjacent inner end 40 as well as an internal ledge 52. Internal ledge 52 has a non-circular opening 54 therein. Such opening can be hexagonal as an example, or as illustrated in FIG. 3 in dotted outline, the opening 54 is square.

An important aspect of the invention is the method of attachment of barrel 34 to the sidewall of cover 20. This is preferably accomplished in a way illustrated in FIG. 5. Barrel 34 is shown supported by a hand drill 56 that has extending from it and received within the handrail chuck 58 a tool (not seen) that has a square cross-sectional extending portion that is slidably and non-rotatably received within barrel non-circular opening 54, as shown in FIG. 4. The barrel boss portion 42 is inserted into opening 32 in cover 20 (see FIG. 2) and drill 56 energized to rapidly rotate the barrel relative to the cover. Rapid rotation while maintaining frictional contact causes the inner end of the barrel, and particularly, the flange surface 44 and most particularly the circumferential contacting edge 46, to frictionally heat both the exterior surface of cover 20 that surrounds opening 32 and the inner end portions of barrel 34. With the barrel rapidly rotated and frictional contact maintained, these surfaces quickly (normally within a few seconds) reach the molten state. The operator then releases hand drill trigger 60 to stop rotation of the barrel but at the same time maintains force of the hand drill against the barrel and thereby the barrel against cover 20 for a short time, normally less than a minute. This allows the contacting surfaces that had been raised to a molten state by the rapid rotation of the barrel to cool to below the molten state. After these surfaces have cooled, which as above indicated, is typically less than one minute, the operator withdraws hand drill 56 and the tool attached to it has been slidably received within the barrel. The barrel is then permanently and securely thermally welded to cover 20.

In the past, others have manufactured covers for pedestals having an integral outwardly extending portion with the radial opening therein that achieves the same purpose as barrel 34 but the manufacturing processes involved in making a cover with an integral portion used for locking the cover to a pedestal is substantially more difficult and expensive than the method herein provided for rotationally welding a barrel to the cover. In addition, others in the past have used metal barrels that are secured to cover 20 by a bolt or bolts.

To lock the cover to the pedestal, a bolt 62 is positioned within the barrel, the bolt extending through non-circular opening 54. Bolt 62 has a head 64. The inner end of bolt 62 is aligned with nut member 30. By rotating bolt 62 it is threaded into nut member 30 to thereby lock the cover 20 to pedestal 10. Bolt head 64 is preferably of a non-conventional configuration, that is, bolt head 64 should not have a conventional wrench engaging surface, such as square, hexagonal or octagonal that it is readily engageable by a standard mechanic socket wrench. Instead, bolt head 64 is preferably five sided or of some other configuration that can be engaged only by a special wrench carried by authorized personnel.

Received on the bolt between head 64 and internal ledge 52 is a spring 66 that urges bolt 62 rearwardly after it is fully unthreaded from nut member 30 so as to make sure the bolt is out of engagement to permit cover 20 to be easily removed.

In order to prevent bolt 62 from being inadvertently lost when a cover is removed, an elastomeric grommet 68 is slidably positioned on the bolt. The use of spring 66 and bolt 62 within a tubular boss portion formed with or attached to a cover is a known procedure and therefore no claim of novelty is made with respect to bolt 62, spring 66 and grommet 68.

Pedestal 10, cover 20 and barrel 34 are all preferably formed of a plastic material, most preferably of a thermoplastic material that is readily bondable by heat fusion. As an example, all of these components can be made of polyethylene.

FIG. 6 is an end view of an alternate embodiment of the barrel, designated by 34A. Barrel 34A is the same in external appearance as the barrel shown in FIG. 3 and is different only in the manner by which it receives attachment of a tool for frictionally welding the barrel to a cover. Instead of receiving a non-circular tool within an opening in internal flange 52 as shown in FIG. 4, the embodiment of FIG. 5 has small diameter shallow depth holes 70 in the barrel outer end 38A. These holes receive a tool (not shown) having a plate with at least two stubs extending from it that are receivable in at least two openings 70. Barrel 70 is rotated in the same way using a tool such drill 56 to rotationally frictionally weld the inner end thereof to a cover. Since in the embodiment of FIG. 6 a tool is not received in opening 54A in internal flange 52A, the opening 54A can be cylindrical as shown. FIG. 6 is illustrative of the fact that other ways can be employed to rotate the barrel.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An improved closure for use on a pedestal for receiving underground wiring, the closure having an improved locking system, the pedestal being hollow and upright and having an open top and an open bottom and a circumferential collar portion surrounding the open top, and having a nut member radially secured in the pedestal collar portion, comprising:

a hollow cover having a closed top and an open bottom and a circumferential collar portion surrounding the open bottom, the open bottom being dimensioned to telescopically receive said pedestal open top and having a radially oriented opening in the cover collar portion that is in alignment with said nut member when the cover is in closed position on said pedestal;

a radially extending tubular barrel welded to said cover collar portion in alignment with said opening therein and extending radially and exteriorly of said cover collar portion; and a bolt received within said tubular barrel and threadably engageable with said nut.

2. An improved closure according to claim 1 wherein said cover and said barrel are formed of plastic and said barrel is frictionally welded to said cover.

3. An improved closure according to claim 2 wherein said barrel is configured to releasibly and non-rotatably receive a rotating tool by which said barrel may be rapidly rotated relative to said cover for frictional welding.

4. An improved closure according to claim 3 wherein said barrel has an internal flange having a non-circular opening therethrough adaptable to slidably receive a tool having a matching non-circular exterior surface.

5. An improved closure according to claim 2 wherein said barrel has an inner end with a short length integral reduced diameter boss portion closely receivable in said cover radial opening, the reduced diameter integral boss portion providing a radial flange surface that engages an exterior surface of said cover collar portion.

6. A barrel adaptable for being frictionally welded to a plastic pedestal cover at an radially oriented opening therein, comprising:

a plastic tubular barrel having an inner end and an outer end, the inner end having a short length integral reduced external diameter boss portion providing a radial flange surface displaced from the barrel inner end and having an internal integral short length flange portion intermediate said inner and outer ends, the internal flange portion having a non-circular external surface by which the barrel may be rapidly rotated for frictionally welding the barrel to a pedestal cover.

7. A method of manufacturing a closure for a pedestal comprising:

molding a hollow cover having a closed top and an open bottom and a circumferential collar portion surrounding and adjacent the open bottom;

forming a radially oriented small diameter opening in said cover collar portion;

forming a plastic tubular barrel having an inner end and being configured to releasibly and non-rotatably receive a concentric tool;

positioning the inner end of said barrel in contact with said cover collar portion and in alignment with said opening therein;

rapidly rotating said barrel while maintaining said inner end thereof in contact with said cover to frictionally weld said barrel to said cover.

8. A method of manufacturing a closure for a pedestal according to claim 7 wherein the step of forming a radially oriented small diameter opening in said cover collar portion includes forming the opening as a part of the process of molding said cover.

9. A method of manufacturing a closure for a pedestal according to claim 7 wherein the step of forming a radially oriented opening includes drilling the opening after the process of molding said cover.

10. A method of manufacturing a closure for a pedestal according to claim 7 wherein the step of forming a plastic tubular barrel includes forming on said inner end an integral short length reduced external diameter boss portion providing a radial flange surface displaced from said barrel inner end, said boss portion being rotatably receivable in said cover radial opening, rotating said barrel serving to rotate said barrel flange surface against said cover collar portion causing a frictional weld of said barrel flange surface to said cover collar portion.

11. A method of manufacturing a closure for a pedestal according to claim 7 wherein the step of forming a plastic tubular barrel includes the step of forming an internal flange within said barrel and forming a non-circular opening through the internal flange and wherein said step of rapidly rotating said barrel includes the step of removably inserting a rotatable tool having a non-circular external surface into said barrel and through said opening in said internal flange.

* * * * *